(12) United States Patent
Yang et al.

(10) Patent No.: US 10,829,628 B2
(45) Date of Patent: Nov. 10, 2020

(54) THERMOPLASTIC RESIN COMPOSITION AND MOLDED ARTICLE MANUFACTURED THEREFROM

(71) Applicant: LOTTE CHEMICAL CORPORATION, Seoul (KR)

(72) Inventors: Cheon Seok Yang, Uiwang-si (KR); Yoen Kyoung Kim, Uiwang-si (KR); Seung Yong Bae, Uiwang-si (KR); Ju Sung Kim, Uiwang-si (KR)

(73) Assignee: Lotte Chemical Corporation, Seoul (KR)

( * ) Notice: Subject to any disclaimer, the term of this patent is extended or adjusted under 35 U.S.C. 154(b) by 0 days.

(21) Appl. No.: 16/466,841

(22) PCT Filed: Dec. 22, 2017

(86) PCT No.: PCT/KR2017/015364
§ 371 (c)(1),
(2) Date: Jun. 5, 2019

(87) PCT Pub. No.: WO2018/124657
PCT Pub. Date: Jul. 5, 2018

(65) Prior Publication Data
US 2019/0322854 A1    Oct. 24, 2019

(30) Foreign Application Priority Data

Dec. 28, 2016 (KR) .................. 10-2016-0181359
Dec. 22, 2017 (KR) .................. 10-2017-0177878

(51) Int. Cl.
*C08L 25/12* (2006.01)
*A01N 59/16* (2006.01)
*H01B 1/12* (2006.01)

(52) U.S. Cl.
CPC .............. *C08L 25/12* (2013.01); *A01N 59/16* (2013.01); *H01B 1/12* (2013.01); *C08L 2201/04* (2013.01); *C08L 2205/035* (2013.01)

(58) Field of Classification Search
CPC ............. C08L 25/12; C08L 2201/04; C08L 2205/035; C08L 2205/03; A01N 59/16; H01B 1/12
See application file for complete search history.

(56) References Cited

U.S. PATENT DOCUMENTS

| 6,166,116 A | 12/2000 | Sleeckx |
| 7,812,078 B2 | 10/2010 | Glasgow et al. |
| 9,150,701 B2 | 10/2015 | Destro et al. |
| 2007/0100038 A1 | 5/2007 | Glasgow et al. |
| 2007/0197372 A1 | 8/2007 | Kurihara et al. |
| 2008/0071024 A1* | 3/2008 | Morishita ............... C08L 77/06 525/66 |
| 2009/0166593 A1 | 7/2009 | Kim et al. |
| 2011/0027386 A1 | 2/2011 | Kurihara et al. |
| 2014/0296442 A1* | 10/2014 | Fiori ..................... C08G 64/24 525/313 |
| 2015/0237866 A1 | 8/2015 | Goudswaard et al. |

FOREIGN PATENT DOCUMENTS

| JP | 08-217936 A | 8/1996 |
| JP | 09-157512 A | 6/1997 |
| JP | 11035787 A * | 2/1999 |
| JP | 11-263705 A | 9/1999 |
| JP | 2005-239904 A | 9/2005 |
| JP | 2009-513776 A | 4/2009 |
| JP | 2009-161758 A | 7/2009 |
| JP | 2009173758 A * | 8/2009 |
| JP | 2011-506722 A | 3/2011 |
| JP | 2017-132913 A | 8/2017 |
| KR | 10-0890796 A | 3/2009 |
| WO | 2018/124657 A1 | 7/2018 |
| WO | 2019/066193 A1 | 4/2019 |

OTHER PUBLICATIONS

International Search Report in counterpart International Application No. PCT/KR2017/015364 dated Apr. 16, 2018, pp. 1-4.
Lakshmi et al., "Insight into the Mechanism of Antibacterial Activity of ZnO: Surface Defects Mediated Reactive Oxygen Species Even in the Dark", Langmuir 2015, vol. 31, pp. 9155-9162 (Jul. 29, 2015) and its supplementary materials (pp. 6).
International Search Report in commonly owned International Application No. PCT/KR2018/006675 dated Sep. 27, 2018, pp. 1-4.

* cited by examiner

*Primary Examiner* — Mark Kopec
*Assistant Examiner* — Jaison P Thomas
(74) *Attorney, Agent, or Firm* — Additon, Higgins & Pendleton, P.A.

(57) ABSTRACT

A thermoplastic resin composition of the present invention is characterized by comprising: about 100 parts by weight of a thermoplastic resin containing a rubber-modified vinyl-based graft copolymer and an aromatic vinyl-based copolymer resin; about 10 to about 30 parts by weight of an antistatic agent; and about 0.01 to about 2 parts by weight of zinc oxide, wherein the antistatic agent comprises at least one of a polyether ester amide block copolymer, a polyalkylene glycol, and a polyamide. The thermoplastic resin composition is excellent in antibacterial properties, antistatic properties, impact resistance, and the like.

14 Claims, No Drawings

THERMOPLASTIC RESIN COMPOSITION AND MOLDED ARTICLE MANUFACTURED THEREFROM

CROSS-REFERENCE TO RELATED APPLICATIONS

This application claims priority to and the benefit of International Application No. PCT/KR2017/015364, filed Dec. 22, 2017, which published as WO 2018/124657 on Jul. 5, 2018; Korean Patent Application No. 10-2016-0181359, filed in the Korean Intellectual Property Office on Dec. 28, 2016; and Korean Patent Application No. 10-2017-0177878, filed in the Korean Intellectual Property Office on Dec. 22, 2017, the entire disclosure of each of which is incorporated herein by reference.

TECHNICAL FIELD

The present invention relates to a thermoplastic resin composition and a molded article manufactured therefrom. More particularly, the present invention relates to a thermoplastic resin composition that exhibits good properties in terms of antibacterial properties, antistatic properties, impact resistance, and the like, and a molded article manufactured therefrom.

BACKGROUND ART

As a thermoplastic resin, a rubber-modified aromatic vinyl copolymer resin such as an acrylonitrile-butadiene-styrene copolymer resin (ABS resin) has good properties in terms of mechanical properties, processability, external appearance, and the like, and is broadly used as interior/exterior materials for electric/electronic products, automobiles, buildings, and the like.

When such resins are used for applications entailing physical contact with the body, such as medical equipment, toys, food containers, and the like, the resins are required to have antibacterial properties to remove or suppress bacteria, antistatic properties to suppress generation of static electricity, and mechanical properties such as impact resistance and the like. Although an inorganic or organic antimicrobial may be used to obtain a thermoplastic resin composition having antibacterial properties, the inorganic antimicrobial can cause discoloration and deterioration in transparency of the thermoplastic resin, and the organic antimicrobial can cause decomposition and elution of the thermoplastic resin upon processing at high temperature, thereby making application thereof difficult in practice.

Therefore, there is a need for a thermoplastic resin composition having not only good antibacterial properties, but also good antistatic properties, impact resistance, and the like.

The background technique of the present invention is disclosed in JP Unexamined Patent Publication No. 2005-239904 and the like.

Disclosure

Technical Problem

It is one object of the present invention to provide a thermoplastic resin composition exhibiting good properties in terms of antibacterial properties, antistatic properties, impact resistance, and the like.

It is another object of the present invention to provide a molded article formed of the thermoplastic resin composition.

The above and other objects of the present invention can be achieved by the present invention described below.

Technical Solution

One aspect of the present invention relates to a thermoplastic resin composition. The thermoplastic resin composition includes: about 100 parts by weight of a thermoplastic resin comprising a rubber-modified vinyl graft copolymer and an aromatic vinyl copolymer resin; about 10 to about 30 parts by weight of an antistatic agent; and about 0.01 to about 2 parts by weight of zinc oxide, wherein the antistatic agent includes at least one selected from among a polyetheresteramide block copolymer, a polyalkylene glycol, and a polyamide.

In one embodiment, the rubber-modified vinyl graft copolymer may be prepared by graft polymerization of a monomer mixture comprising an aromatic vinyl monomer and a vinyl cyanide monomer to a rubber polymer.

In one embodiment, the aromatic vinyl copolymer resin may be a polymer of an aromatic vinyl monomer and a monomer copolymerizable with the aromatic vinyl monomer.

In one embodiment, the rubber-modified vinyl graft copolymer may be present in an amount of about 20 wt % to about 50 wt % and the aromatic vinyl copolymer resin is present in an amount of about 50 wt % to about 80 wt %, based on 100 wt % of the thermoplastic resin.

In one embodiment, the zinc oxide may have an average particle diameter of about 0.2 μm to about 3 μm and a BET specific surface area of about 1 m$^2$/g to about 10 m$^2$/g.

In one embodiment, the zinc oxide may have a peak intensity ratio (B/A) of about 0 to about 1, where A indicates a peak in the wavelength range of 370 nm to 390 nm and B indicates a peak in the wavelength range of 450 nm to 600 nm in photoluminescence measurement. [15] In one embodiment, the zinc oxide may have a peak position (2θ) in the range of 35° to 37° and a crystallite size of about 1,000 Å to about 2,000 Å, in X-ray diffraction (XRD) analysis, as calculated by Equation 1:

$$\text{Crystallite size } (D) = \frac{K\lambda}{\beta \cos\theta} \qquad \text{[Equation 1]}$$

where K is a shape factor, λ is an X-ray wavelength, β is an FWHM value (degree) of an X-ray diffraction peak, and θ is a peak position degree.

In one embodiment, the thermoplastic resin composition may have an antibacterial activity of about 2 to about 7 against *Staphylococcus aureus* and an antibacterial activity of about 2 to about 6.5 against *Escherichia coli*, as measured on 5 cm×5 cm specimens inoculated with *Staphylococcus aureus* and *Escherichia coli*, respectively, in accordance with JIS Z 2801.

In one embodiment, the thermoplastic resin composition may have a surface resistance of about 1×10$^6$ Ω·cm to about 1×10$^{10}$ Ω·cm, as measured in accordance with ASTM D257.

In one embodiment, the thermoplastic resin composition may have an Izod impact strength of about 15 kgf·cm/cm to about 25 kgf·cm/cm, as measured on a ⅛" thick specimen in accordance with ASTM D256.

Another aspect of the present invention relates to a molded article. The molded article may be formed of the thermoplastic resin composition as set forth above.

Advantageous Effects

The present invention provides a thermoplastic resin composition that has good properties in terms of antibacterial properties, antistatic properties, impact resistance, and the like, and a molded article formed of the same.

Best Mode

Hereinafter, embodiments of the present invention will be described in detail.

A thermoplastic resin composition according to the present invention includes (A) a thermoplastic resin including (A1) a rubber-modified vinyl graft copolymer and (A2) an aromatic vinyl copolymer resin; (B) an antistatic agent; and (C) zinc oxide.

(A) Thermoplastic resin

According to the present invention, the thermoplastic resin may be a rubber-modified vinyl copolymer resin including the (A1) rubber-modified vinyl graft copolymer and the (A2) aromatic vinyl copolymer resin.

(A1) Rubber-modified aromatic vinyl graft copolymer

According to one embodiment of the invention, the rubber-modified vinyl graft copolymer may be obtained by graft polymerization of a monomer mixture comprising an aromatic vinyl monomer and a vinyl cyanide monomer to a rubber polymer. For example, the rubber-modified vinyl graft copolymer may be obtained by graft polymerization of the monomer mixture comprising the aromatic vinyl monomer and the vinyl cyanide monomer to the rubber polymer, in which the monomer mixture may further include a monomer for imparting processability and heat resistance, as needed. Here, polymerization may be performed by any typical polymerization method, such as emulsion polymerization, suspension polymerization, and the like. In addition, the rubber-modified vinyl graft copolymer may form a core (rubber polymer)-shell (copolymer of the monomer mixture) structure, without being limited thereto.

In some embodiments, the rubber polymer may include diene rubbers, such as polybutadiene, poly(styrene-butadiene), and poly(acrylonitrile-butadiene); saturated rubbers obtained by adding hydrogen to the diene rubbers; isoprene rubbers; $C_2$ to $C_{10}$ alkyl (meth)acrylate rubbers, a copolymer of a $C_2$ to $C_{10}$ alkyl (meth)acrylate and styrene; and ethylene-propylene-diene monomer terpolymer (EPDM). These may be used alone or as a mixture thereof. For example, the rubber polymer may include diene rubbers and (meth)acrylate rubbers. Specifically, the rubber polymer may include butadiene rubber and butyl acrylate rubber. The rubber polymer (rubber particle) may have an average particle diameter (Z-average) of about 0.05 μm to about 6 μm, for example, about 0.15 μm to about 4 μm, specifically about 0.25 μm to about 3.5 μm. Within this range, the thermoplastic resin composition can have good properties in terms of impact resistance, external appearance, and the like.

In some embodiments, based on 100 wt % of the rubber-modified vinyl graft copolymer, the rubber polymer may be present in an amount of about 20 wt % to about 70 wt %, for example, about 25 wt % to about 60 wt %, and the monomer mixture (including the aromatic vinyl monomer and the vinyl cyanide monomer) may be present in an amount of about 30 wt % to about 80 wt %, for example, about 40 wt % to about 75 wt %. Within this range, the thermoplastic resin composition can have good properties in terms of impact resistance, external appearance, and the like.

In some embodiments, the aromatic vinyl monomer is a monomer copolymerizable with the rubber copolymer and may include, for example, styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene, without being limited thereto. These may be used alone or as a mixture thereof. The aromatic vinyl monomer may be present in an amount of about 10 wt % to about 90 wt %, for example, about 40 wt % to about 90 wt %, based on 100 wt % of the monomer mixture. Within this range, the thermoplastic resin composition can have good properties in terms of processability, impact resistance, and the like.

In some embodiments, the vinyl cyanide monomer is copolymerizable with the aromatic vinyl monomer, and may include, for example, acrylonitrile, methacrylonitrile, ethacrylonitrile, phenyl acrylonitrile, α-chloroacrylonitrile, fumaronitrile, and the like. These may be used alone or as a mixture thereof. For example, the vinyl cyanide monomer may be acrylonitrile and methacrylonitrile. The vinyl cyanide monomer may be present in an amount of about 10 wt % to about 90 wt %, for example, about 10 wt % to about 60 wt %, based on 100 wt % of the monomer mixture. Within this range, the thermoplastic resin composition can have good properties in terms of chemical resistance, mechanical properties, and the like.

Examples of the monomer for imparting processability and heat resistance may include (meth)acrylic acid, maleic anhydride, and N-substituted maleimide, without being limited thereto. The monomer for imparting processability and heat resistance may be present in an amount of about 15 wt % or less, for example, about 0.1 wt % to about 10 wt %, based on 100 wt % of the monomer mixture. Within this range, the monomer for imparting processability and heat resistance can impart processability and heat resistance to the thermoplastic resin composition without deterioration in other properties.

Examples of the rubber-modified vinyl graft copolymer may include a g-ABS copolymer obtained by grafting a styrene monomer (as the aromatic vinyl compound) and an acrylonitrile monomer (as the vinyl cyanide compound) to a butadiene-based rubber polymer, an acrylate-styrene-acrylate (g-ASA) copolymer obtained by grafting a styrene monomer (as the aromatic vinyl compound) and an acrylonitrile monomer (as the vinyl cyanide compound) to a butyl acrylate-based rubber polymer, and the like.

In some embodiments, the rubber-modified vinyl graft copolymer may be present in an amount of about 20 wt % to about 50 wt %, for example, about 25 wt % to about 45 wt %, based on 100 wt % of the thermoplastic resin (including the rubber-modified vinyl graft copolymer and the aromatic vinyl copolymer resin). Within this range, the thermoplastic resin composition can exhibit good properties in terms of impact resistance, fluidity (molding processability), external appearance, and balance therebetween.

(A2) Aromatic vinyl copolymer resin

According to the embodiment of the invention, the aromatic vinyl copolymer resin may be an aromatic vinyl copolymer resin used for a typical rubber-modified vinyl graft copolymer resin. For example, the aromatic vinyl copolymer resin may be a polymer of a monomer mixture comprising an aromatic vinyl monomer and a monomer copolymerizable with the aromatic vinyl monomer, such as a vinyl cyanide monomer.

In some embodiments, the aromatic vinyl copolymer resin may be prepared by mixing the aromatic vinyl monomer and the monomer copolymerizable with the aromatic vinyl monomer, followed by polymerization. Here, polymerization may be carried out by any well-known polymerization method, such as emulsion polymerization, suspension polymerization, bulk polymerization, and the like.

Examples of the aromatic vinyl monomer may include styrene, α-methylstyrene, β-methylstyrene, p-methylstyrene, p-t-butylstyrene, ethylstyrene, vinylxylene, monochlorostyrene, dichlorostyrene, dibromostyrene, and vinyl naphthalene. These may be used alone or as a mixture thereof. The aromatic vinyl monomer may be present in an amount of about 20 wt % to about 90 wt %, for example, about 30 wt % to about 80 wt %, based on 100 wt % of the aromatic vinyl copolymer resin. Within this range, the thermoplastic resin composition can exhibit good properties in terms of impact resistance, fluidity, and the like.

In some embodiments, the monomer copolymerizable with the aromatic vinyl monomer may include at least one selected from among a vinyl cyanide monomer and an alkyl (meth)acrylic monomer. For example, the monomer copolymerizable with the aromatic vinyl monomer may include a vinyl cyanide monomer, or a vinyl cyanide monomer and an alkyl (meth)acrylic monomer, specifically a vinyl cyanide monomer and an alkyl (meth)acrylic monomer.

Examples of the vinyl cyanide monomer may include acrylonitrile, methacrylonitrile, ethacrylonitrile, phenylacrylonitrile, α-chloroacrylonitrile, and fumaronitrile, without being limited thereto. These may be used alone or as a mixture thereof. For example, acrylonitrile, methacrylonitrile, and the like may be used.

In some embodiments, the alkyl (meth)acrylic monomer may include (meth)acrylic acid and/or $C_1$ to $C_{10}$ alkyl (meth)acrylates. These may be used alone or as a mixture thereof. For example, methyl methacrylate, methyl acrylate, and the like may be used.

In some embodiments, when the monomer copolymerizable with the aromatic vinyl monomer is composed of a mixture of the vinyl cyanide monomer and the alkyl (meth) acrylic monomer, the vinyl cyanide monomer may be present in an amount of about 1 wt % to about 40 wt %, for example, about 2 wt % to about 35 wt %, and the alkyl (meth)acrylic monomer may be present in an amount of about 60 wt % to about 99 wt %, for example, about 65 wt % to about 98 wt %, in the monomer copolymerizable with the aromatic vinyl monomer. Within this range, the thermoplastic resin composition can exhibit good properties in terms of transparency, heat resistance, processability, and the like.

In some embodiments, the monomer copolymerizable with the aromatic vinyl monomer may be present in an amount of about 10 wt % to about 80 wt %, for example, about 20 wt % to about 70 wt %, based on 100 wt % of the aromatic vinyl copolymer resin. Within this range, the thermoplastic resin composition can exhibit good properties in terms of impact resistance, fluidity, and the like.

In some embodiments, the aromatic vinyl copolymer resin may have a weight average molecular weight (Mw) of about 10,000 g/mol to about 300,000 g/mol, for example, about 15,000 g/mol to about 150,000 g/mol, as measured by gel permeation chromatography (GPC). Within this range, the thermoplastic resin exhibits good properties in terms of mechanical strength, formability, and the like.

In some embodiments, the aromatic vinyl copolymer resin may be present in an amount of about 50 wt % to about 80 wt %, for example, about 55 wt % to about 75 wt %, based on 100 wt % of the thermoplastic resin. Within this range, the thermoplastic resin composition can exhibit good properties in terms of impact resistance, fluidity (molding processability), and the like.

(B) Antistatic agent

According to the embodiment of the invention, the antistatic agent serves to improve antibacterial properties and antistatic properties of the thermoplastic resin composition (specimen) in cooperation with a small amount of zinc oxide, and may include a polyetheresteramide block copolymer, a polyalkylene glycol, a polyamide, and a combination thereof. Preferably, the antistatic agent includes a polyetheresteramide block copolymer, and a commercially available antistatic agent comprising the polyetheresteramide-based copolymer may be used.

In some embodiments, the polyetheresteramide block copolymer may be a block copolymer of a reaction mixture comprising an amino carboxylic acid, lactam or diamine-dicarboxylic acid salt having 6 or more carbon atoms; a polyalkylene glycol; and a $C_4$ to $C_{20}$ dicarboxylic acid.

Examples of the amino carboxylic acid, lactam or diamine-dicarboxylic acid salt having 6 or more carbon atoms may include aminocarboxylic acids, such as ω-aminocaproic acid, ω-aminoenanthic acid, ω-aminocaprylic acid, ω-aminopelargonic acid, ω-aminocapric acid, 1,1-aminoundecanoic acid, 1,2-aminododecanoic acid, and the like; lactams, such as caprolactam, enantolactam, capryllactam, lauryllactam, and the like; and salts of diamines and dicarboxylic acids, such as salts of hexamethylenediamine-adipic acid, salts of hexamethylenediamine-isophthalic acid, and the like. For example, 1,2-aminododecanoic acid, caprolactam, and salts of hexamethylenediamine-adipic acid may be used.

Examples of the polyalkylene glycol may include polyethylene glycol, poly(1,2- and 1,3-propylene glycol), polytetramethylene glycol, polyhexamethylene glycol, a block or random copolymer of ethylene glycol and propylene glycol, and a copolymer of ethylene glycol and tetrahydrofuran. For example, polyethylene glycol, a copolymer of ethylene glycol and propylene glycol, and the like may be used.

Examples of the $C_4$ to $C_{20}$ dicarboxylic acid may include terephthalic acid, 1,4-cyclohexacarboxylic acid, sebacic acid, adipic acid, and dodecane carboxylic acid.

In some embodiments, a bond between the amino carboxylic acid, lactam or diamine-dicarboxylic acid salt having 6 or more carbon atoms and the polyalkylene glycol may be an ester bond; a bond between the amino carboxylic acid, lactam or diamine-dicarboxylic acid salt having 6 or more carbon atoms and the $C_4$ to $C_{20}$ dicarboxylic acid may be an amide bond; and a bond between the polyalkylene glycol and the $C_4$ to $C_{20}$ dicarboxylic acid may be an ester bond.

In some embodiments, the polyetheresteramide block copolymer may be prepared by a well-known method in the art, for example, by a method disclosed in JP Patent Publication No. S56-045419 or JP Unexamined Patent Publication No. S55-133424.

In some embodiments, the polyetheresteramide block copolymer may include about 10 wt % to about 95 wt % of the polyether-ester block. Within this range, the thermoplastic resin composition can have good properties in terms of mechanical properties, antistatic properties, and the like.

In some embodiments, the antistatic agent may be present in an amount of about 10 to about 30 parts by weight, for example, about 12 to about 25 parts by weight, specifically about 14 to about 20 parts by weight, relative to about 100 parts by weight of the thermoplastic resin. If the content of the antistatic agent is less than about 10 parts by weight, the thermoplastic resin composition can suffer from deterioration in antibacterial properties and antistatic properties, and if the content thereof exceeds about 30 parts by weight, the thermoplastic resin composition can suffer from deterioration in impact resistance, external appearance, and the like.

(C) Zinc oxide

According to the present invention, the zinc oxide serves to improve low-odor and antibacterial properties of the thermoplastic resin composition together with the heat stabilizer, and may be selected from any zinc oxide used in a typical antibacterial composition.

In some embodiments, the zinc oxide may have an average particle diameter (D50) of about 0.2 μm to about 3 μm, for example, about 0.3 μm to about 2 μm, as measured using a particle size analyzer, a BET specific surface area of about 1 m²/g to about 10 m²/g, for example, about 1 m²/g to about 7 m²/g, and a purity of about 99% or higher. Within this range, the thermoplastic resin composition can exhibit good properties in terms of antibacterial properties, weather resistance, and the like.

In some embodiments, the zinc oxide may have a peak intensity ratio (B/A) of about 0 to about 1, for example, about 0.01 to about 0.09, or about 0.1 to about 1, where A indicates a peak in the wavelength range of 370 nm to 390 nm and B indicates a peak in the wavelength range of 450 nm to 600 nm in photoluminescence measurement. Within this range, the thermoplastic resin composition can have further improved properties in terms of antibacterial properties, low-odor, or weather resistance.

In some embodiments, the zinc oxide may have a peak position degree (2θ) in the range of 35° to 37° and a crystallite size of about 1,000 Å to about 2,000 Å, for example, about 1,200 Å to about 1,800 Å, in X-ray diffraction (XRD) analysis, as calculated by Scherrer's Equation (Equation 1) with reference to a measured FWHM value (full width at half maximum of a diffraction peak). Within this range, the thermoplastic resin composition can have good properties in terms of initial color, weather resistance, antibacterial properties, and the like.

$$\text{Crystallite size } (D) = \frac{K\lambda}{\beta \cos\theta},\quad \text{[Equation 1]}$$

where K is a shape factor, λ is an X-ray wavelength, β is an FWHM value (degree), and θ is a peak position degree.

In some embodiments, the zinc oxide may be prepared by melting zinc particles in a reactor, heating the molten zinc to about 850° C. to about 1,000° C., for example, about 900° C. to about 950° C., to vaporize the molten zinc, injecting oxygen gas into the reactor, cooling the reactor to about 20° C. to about 30° C., followed by heating the reactor to about 700° C. to about 800° C. for about 30 min to about 150 min while injecting nitrogen/hydrogen gas into the reactor, as needed, and cooling the reactor to room temperature (about 20° C. to about 30° C.)

In some embodiments, the zinc oxide may be present in an amount of about 0.01 to about 2 parts by weight, for example, about 0.02 to about 0.5 parts by weight, specifically about 0.03 to about 0.2 parts by weight, relative to about 100 parts by weight of the thermoplastic resin. If the content of the zinc oxide is less than about 0.01 parts by weight, the thermoplastic resin composition can suffer from deterioration in antibacterial properties, and if the content thereof exceeds about 0.2 parts by weight, the thermoplastic resin composition can suffer from deterioration in external appearance (transparency) and the like.

According to one embodiment of the invention, the thermoplastic resin composition may further include additives used in typical thermoplastic resin compositions. Examples of the additives may include a flame retardant, fillers, an antioxidant agent, an anti-dripping agent, a lubricant, a release agent, a nucleating agent, an antistatic agent, a stabilizer, a pigment, a dye, and a mixture thereof, without being limited thereto. The additives may be present in an amount of about 0.001 to about 40 parts by weight, for example, about 0.1 to about 10 parts by weight, relative to about 100 parts by weight of the thermoplastic resin.

According to one embodiment of the invention, the thermoplastic resin composition may be prepared in pellet form by mixing the aforementioned components, followed by melt extrusion using a typical twin-screw extruder at about 200° C. to about 280° C., for example, about 220° C. to about 250° C.

In some embodiments, the thermoplastic resin composition may have an antibacterial activity of about 2 to about 7 against *Staphylococcus aureus* and an antibacterial activity of about 2 to about 6.5 against *Escherichia coli*, as measured on 5 cm×5 cm specimens in accordance with JIS Z 2801 after inoculation with *Staphylococcus aureus* and *Escherichia coli*, respectively, followed by culturing under conditions of 35° C. and 90% RH for 24 hours.

In some embodiments, the thermoplastic resin composition may have a surface resistance of about $1\times10^6$ Ω·cm to about $1\times10^{10}$ Ω·m, for example, about $1\times10^8$ Ω·cm to about $1\times10^{10}$ Ω·cm, as measured in accordance with ASTM D257.

In some embodiments, the thermoplastic resin composition may have an Izod impact strength of about 15 kgf·cm/cm to about 25 kgf·cm/cm, for example, about 18 kgf·cm/cm to about 23 kgf·cm/cm, as measured on a ⅛" thick specimen in accordance with ASTM D256.

A molded article according to the present invention is produced from the thermoplastic resin composition. The thermoplastic resin composition may be prepared in pellet form and the prepared pellets may be produced into various molded articles (products) by various molding methods, such as injection molding, extrusion, vacuum molding, and casting. Such molding methods are well known to those skilled in the art. The molded articles exhibit good properties in terms of antibacterial properties, antistatic properties, impact resistance, transparency, fluidity (molding processability), and balance therebetween, and thus may be used in various fields including materials for medical products, and interior/exterior materials for electric/electronic products, and the like.

Mode for Invention

Next, the present invention will be described in more detail with reference to some examples. It should be understood that these examples are provided for illustration only and are not to be construed in any way as limiting the invention.

EXAMPLE

Details of components used in Examples and Comparative Examples are as follows.

(A) Thermoplastic resin (A1) Rubber-modified aromatic vinyl graft copolymer

A g-ABS copolymer obtained by grafting 55 wt % of a mixture comprising styrene and acrylonitrile (weight ratio:

75/25) to 45 wt % of butadiene rubber having a Z-average particle diameter of 310 nm was used.

(A2) Aromatic vinyl copolymer resin (A2-1) A SAN resin (weight average molecular weight: 130,000 g/mol) obtained through polymerization of 71 wt % of styrene and 29 wt % of acrylonitrile was used.

(A2-2) A methyl methacrylate-styrene-acrylonitrile copolymer (MSAN, weight average molecular weight: 90,000 g/mol) prepared by polymerizing 74 wt % of methyl methacrylate, 22 wt % of styrene and 4 wt % of acrylonitrile was used.

(B) Antistatic agent (B1) An antistatic agent (Product Name: PELECTRON AS, Manufacturer: Sanyo Co., Ltd.) comprising a polyetheresteramide block copolymer was used.

(B2) Ultramide 8270HS (BASF) was used.

(C) Zinc oxide

Zinc oxide having an average particle diameter of 1.2 μm, a BET surface area of 5.5 m²/g, a purity of 99.9%, a peak intensity ratio (B/A) of 0.28, where A indicates a peak in the wavelength range of 370 nm to 390 nm and B indicates a peak in the wavelength range of 450 nm to 600 nm in photoluminescence measurement, and a crystallite size of 1,750 Å was used.

(D) Titanium oxide (Product Name: WH-01, Manufacturer: Kemira Specialty Corp.) was used.

Property Measurement (1) Average particle diameter (unit: μm): Average particle diameter was measured using a particle size analyzer (Laser Diffraction Particle size analyzer LS 13 320, Beckman Coulter Co., Ltd.).

(2) BET surface area (unit: m²/g): BET surface area was measured by a nitrogen gas adsorption method using a BET analyzer (Surface Area and Porosity Analyzer ASAP 2020, Micromeritics Co., Ltd.).

(3) Purity (unit: %): Purity was measured by thermogravimetric analysis (TGA) based on the weight of the remaining material at 800° C.

(4) PL peak intensity ratio (B/A): Spectrum emitted upon irradiation of a specimen using a He—Cd laser (KIMMON, 30 mW) at a wavelength of 325 nm at room temperature was detected by a CCD detector in a photoluminescence measurement method, in which the CCD detector was maintained at −70° C. A peak intensity ratio (B/A) of peak B in the wavelength range of 450 nm to 600 nm to peak A in the wavelength range of 370 nm to 390 nm was measured. Here, an injection molded specimen was irradiated with laser beams without separate treatment upon PL analysis and zinc oxide powder was compressed in a pelletizer having a diameter of 6 mm to prepare a flat specimen.

(5) Crystallite size (unit: Å): Crystallite size was measured using a high-resolution X-ray diffractometer (PROMRD, X'pert Co., Ltd.) at a peak position degree (2θ) in the range of 35° to 37° and calculated by Scherrer's Equation (Equation 1) with reference to a measured FWHM value (full width at half maximum of a diffraction peak). Here, both a specimen in powder form and an injection molded specimen could be used, and for more accurate analysis, the injection molded specimen was subjected to heat treatment at 600° C. in air for 2 hours to remove a polymer resin before XRD analysis.

$$\text{Crystallite size } (D) = \frac{K\lambda}{\beta \cos\theta}, \quad \text{[Equation 2]}$$

where K is a shape factor, λ is an X-ray wavelength, β is an FWHM value (degree), and θ is a peak position degree.

Examples 1 to 5 and Comparative Examples 1 to 6

The above components were weighed in amounts as listed in Tables 1 and 2, and subjected to extrusion at 230° C., thereby preparing pellets. Extrusion was performed using a twin-screw extruder (L/D=Φ, 1:45 mm). The prepared pellets were dried at 80° C. for 2 hours or more and injection-molded in a 6 oz. injection molding machine (molding temperature: 230° C., mold temperature: 60° C.), thereby preparing specimens. The prepared specimens were evaluated as to the following properties by the following method, and results are shown in Tables 1 and 2.

Property Evaluation (1) Antibacterial activity: Antibacterial activity was measured on 5 cm×5 cm specimens obtained by inoculation with *Staphylococcus aureus* and *Escherichia coli*, respectively, followed by culturing under conditions of 35° C. and 90% RH for 24 hours, in accordance with JIS Z 2801.

(2) Surface resistance (unit: Ω·cm): Surface resistance was measured using a surface resistance tester (Model: Hiresta-UP(MCP-HT450), Manufacturer: Mitsubishi Chemical Co., Ltd.) in accordance with ASTM D257.

(3) Impact resistance (kgf·cm/cm): Izod impact strength was measured on a ¼" thick specimen in accordance with ASTM D256.

(4) Transparency (haze) (unit: %): Transparency (haze) was measured on a 2.5 mm thick specimen using a haze meter NDH 2000 (Nippon Denshoku Co., Ltd.) in accordance with ASTM D1003.

TABLE 1

| | | Example | | | | |
| --- | --- | --- | --- | --- | --- | --- |
| | | 1 | 2 | 3 | 4 | 5 |
| (A) | (A1) | 29 | 29 | 29 | 29 | 29 |
| (wt %) | (A2-1) | 60 | 60 | 60 | 60 | 60 |
| | (A2-2) | 11 | 11 | 11 | 11 | 11 |
| (B) | (B1) | 10 | 20 | 30 | 20 | 20 |
| (parts by weight) | (B2) | — | — | — | — | — |
| (C) (parts by weight) | | 0.05 | 0.05 | 0.05 | 0.01 | 0.2 |
| (D) (parts by weight) | | — | — | — | — | — |
| Antibacterial activity (*Escherichia coli*) | | 4.1 | 6.4 | 6.1 | 4.1 | 6.3 |
| Antibacterial activity (*Staphylococcus aureus*) | | 3.3 | 4 | 4 | 2.3 | 4 |

TABLE 1-continued

|  | Example | | | | |
|---|---|---|---|---|---|
|  | 1 | 2 | 3 | 4 | 5 |
| Surface resistance (Ω · cm) | $4.8 \times 10^8$ | $2.4 \times 10^9$ | $4 \times 10^8$ | $2.3 \times 10^9$ | $2.6 \times 10^9$ |
| Notched Izod impact strength (kgf · cm/cm) | 18.1 | 21.3 | 15.7 | 19.9 | 18.9 |
| Transparency (Haze) | 9.8 | 14.8 | 23.1 | 12.1 | 31.7 |

*parts by weight: (A) parts by weight relative to 100 parts by weight

TABLE 2

|  |  | Comparative Example | | | | | |
|---|---|---|---|---|---|---|---|
|  |  | 1 | 2 | 3 | 4 | 5 | 6 |
| (A) (wt %) | (A1) | 29 | 29 | 29 | 29 | 29 | 29 |
|  | (A2-1) | 60 | 60 | 60 | 60 | 60 | 60 |
|  | (A2-2) | 11 | 11 | 11 | 11 | 11 | 11 |
| (B) (parts by weight) | (B1) | 5 | 35 | 20 | 20 | — | 20 |
|  | (B2) | — | — | — | — | 20 | — |
| (C) (parts by weight) |  | 0.05 | 0.05 | 0.005 | 4 | 0.05 | — |
| (D) (parts by weight) |  | — | — | — | — | — | 0.05 |
| Antibacterial activity (*Escherichia coli*) |  | 2.1 | 6.1 | 1.1 | 6.8 | 1.1 | 0.6 |
| Antibacterial activity (*Staphylococcus aureus*) |  | 0.3 | 4 | 0.3 | 4 | 0.2 | 0.2 |
| Surface resistance (Ω · cm) |  | $4.8 \times 10^{11}$ | $4.2 \times 10^8$ | $2.1 \times 10^9$ | $2.6 \times 10^9$ | $4.8 \times 10^{13}$ or more | $2.4 \times 10^9$ |
| Notched Izod impact strength (kgf · cm/cm) |  | 17.1 | 12.1 | 20.1 | 19.5 | 17.2 | 19.6 |
| Transparency (Haze) |  | 8.7 | 28.6 | 11.9 | 50.7 | 30.2 | 10.2 |

*Parts by weight: (A) Parts by weight relative to 100 parts by weight

From the result, it can be seen that the thermoplastic resin composition according to the present invention has good properties in terms of antibacterial properties, antistatic properties, impact resistance, and the like.

Conversely, it could be seen that the composition of Comparative Example 1 prepared using a small amount of the antistatic agent suffered from deterioration in antistatic properties, had surface resistance exceed a measurable range, and suffered from significant deterioration in antibacterial properties (*S. aureus*); the composition of Comparative Example 2 prepared using an excess of the antistatic agent suffered from deterioration in impact resistance; the composition of Comparative Example 3 prepared using a small amount of zinc oxide suffered from significant deterioration in antibacterial properties; and the composition of Comparative Example 4 prepared using an excess of zinc oxide was substantially opaque. In addition, it could be seen that the composition of Comparative Example 5 prepared using the antistatic agent (B2) suffered from deterioration in antistatic properties, antibacterial properties, and the like, and the composition of Comparative Example 6 prepared using titanium oxide as the antimicrobial agent suffered from significant deterioration in antibacterial properties.

It should be understood that various modifications, changes, alterations, and equivalent embodiments can be made by those skilled in the art without departing from the spirit and scope of the present invention.

The invention claimed is:

1. A thermoplastic resin composition comprising:
   about 100 parts by weight of a thermoplastic resin comprising a rubber-modified vinyl graft copolymer and an aromatic vinyl copolymer resin;
   about 10 to about 30 parts by weight of an antistatic agent; and
   about 0.01 to about 2 parts by weight of zinc oxide,
   wherein the antistatic agent comprises a polyetheresteramide block copolymer, a polyalkylene glycol, and/or a polyamide, and
   wherein the zinc oxide has a peak position (2θ) in the range of 35° to 37° and a crystallite size of about 1,000 Å to about 2,000 Å, in X-ray diffraction (XRD) analysis, as calculated by Equation 1:

$$\text{Crystallite size } (D) = \frac{K\lambda}{\beta \cos \theta} \quad \text{[Equation 1]}$$

where K is a shape factor, λ is an X-ray wavelength, β is a full width at half maximum (FWHM) value (degree) of an X-ray diffraction peak, and θ is a peak position degree.

2. The thermoplastic resin composition according to claim 1, wherein the rubber-modified vinyl graft copolymer is prepared by graft polymerization of a monomer mixture comprising an aromatic vinyl monomer and a vinyl cyanide monomer to a rubber polymer.

3. The thermoplastic resin composition according to claim 1, wherein the aromatic vinyl copolymer resin is a polymer of an aromatic vinyl monomer and a monomer copolymerizable with the aromatic vinyl monomer.

4. The thermoplastic resin composition according to claim 1, wherein the rubber-modified vinyl graft copolymer is present in an amount of about 20 wt % to about 50 wt % and the aromatic vinyl copolymer resin is present in an amount of about 50 wt % to about 80 wt %, based on 100 wt % of the thermoplastic resin.

5. The thermoplastic resin composition according to claim 1, wherein the zinc oxide has an average particle diameter of about 0.2 μm to about 3 μm and a BET specific surface area of about 1 m$^2$/g to about 10 m$^2$/g.

6. The thermoplastic resin composition according to claim 1, wherein the zinc oxide has a peak intensity ratio (B/A) of about 0 to about 1, where A indicates a peak in the wavelength range of 370 nm to 390 nm and B indicates a peak in the wavelength range of 450 nm to 600 nm in photoluminescence measurement.

7. The thermoplastic resin composition according to claim 1, wherein the thermoplastic resin composition has an antibacterial activity of about 2 to about 7 against *Staphylococcus aureus* and an antibacterial activity of about 2 to about 6.5 against *Escherichia coli*, as measured on 5 cm×5 cm specimens inoculated with *Staphylococcus aureus* and *Escherichia coli*, respectively, in accordance with JIS Z 2801.

8. The thermoplastic resin composition according to claim 1, wherein the thermoplastic resin composition has a surface resistance of about 1×10$^6$ Ω·cm to about 1×10$^{10}$ Ω·cm, as measured in accordance with ASTM D257.

9. The thermoplastic resin composition according to claim 1, wherein the thermoplastic resin composition has an Izod impact strength of about 15 kgf·cm/cm to about 25 kgf·cm/cm, as measured on a ⅛" thick specimen in accordance with ASTM D256.

10. A molded article formed of the thermoplastic resin composition according to claim 1.

11. A thermoplastic resin composition comprising:
    about 100 parts by weight of a thermoplastic resin comprising a rubber-modified vinyl graft copolymer and an aromatic vinyl copolymer resin;
    about 10 to about 30 parts by weight of an antistatic agent; and
    about 0.01 to about 2 parts by weight of zinc oxide,
    wherein the antistatic agent comprises a polyetheresteramide block copolymer, a polyalkylene glycol, and/or a polyamide,
    wherein the zinc oxide has a peak intensity ratio (B/A) of about 0 to about 1, where A indicates a peak in the wavelength range of 370 nm to 390 nm and B indicates a peak in the wavelength range of 450 nm to 600 nm in photoluminescence measurement, a peak position (2θ) in the range of 35° to 37°, and a crystallite size of about 1,000 Å to about 2,000 Å, in X-ray diffraction (XRD) analysis, as calculated by Equation 1:

$$\text{Crystallite size } (D) = \frac{K\lambda}{\beta \cos \theta} \quad \text{[Equation 1]}$$

where K is a shape factor, λ is an X-ray wavelength, β is a full width at half maximum (FWHM) value (degree) of an X-ray diffraction peak, and θ is a peak position degree, and wherein the thermoplastic resin composition has an antibacterial activity of about 2 to about 7 against *Staphylococcus aureus* and an antibacterial activity of about 2 to about 6.5 against *Escherichia coli*, as measured on 5 cm×5 cm specimens inoculated with *Staphylococcus aureus* and *Escherichia coli*, respectively, in accordance with JIS Z 2801.

12. The thermoplastic resin composition according to claim 11, wherein the thermoplastic resin composition has a surface resistance of about 1×10$^6$ Ω·cm to about 1×10$^{10}$ Ω·cm, as measured in accordance with ASTM D257.

13. The thermoplastic resin composition according to claim 12, wherein the thermoplastic resin composition has an Izod impact strength of about 15 kgf·cm/cm to about 25 kgf·cm/cm, as measured on a ⅛" thick specimen in accordance with ASTM D256.

14. A molded article formed of the thermoplastic resin composition according to claim 11.

\* \* \* \* \*